United States Patent [19]
Gupta

[11] Patent Number: 5,934,842
[45] Date of Patent: Aug. 10, 1999

[54] HIGH-SPEED MILLING CUTTER WITH STRESS EQUILIBRATING ARMS

[75] Inventor: Parag Gupta, Indiana, Pa.

[73] Assignee: Kennametal Inc., Latrobe, Pa.

[21] Appl. No.: 08/908,737

[22] Filed: Aug. 7, 1997

[51] Int. Cl.[6] ................................................. B23C 5/20
[52] U.S. Cl. .............................. 407/40; 407/43; 407/51; 407/53; 407/120
[58] Field of Search ................................ 407/40, 34, 35, 407/43, 46, 47, 48, 53, 118, 119, 120, 56, 58, 38; 408/144, 38

[56] References Cited

U.S. PATENT DOCUMENTS

| | | | |
|---|---|---|---|
| 3,576,200 | 4/1971 | Elmes | 407/118 X |
| 4,143,723 | 3/1979 | Schmotzer | 408/144 X |
| 4,309,132 | 1/1982 | Adamson et al. | 407/48 X |
| 4,470,731 | 9/1984 | Erkfritz | 407/38 |
| 4,616,964 | 10/1986 | Nomura | 408/144 |
| 4,702,649 | 10/1987 | Komanduri | 407/119 |
| 4,993,505 | 2/1991 | Packer et al. | 407/118 X |
| 5,135,337 | 8/1992 | Adamson | 407/119 |
| 5,154,549 | 10/1992 | Isobe et al. | 407/119 X |
| 5,178,645 | 1/1993 | Nakamura et al. | 407/119 X |
| 5,393,174 | 2/1995 | Wawrzyniak | 407/58 X |
| 5,478,178 | 12/1995 | Pawlick | 408/153 |
| 5,542,794 | 8/1996 | Smith et al. | 407/35 |
| 5,605,420 | 2/1997 | Feldsine | 407/32 |
| 5,800,079 | 9/1998 | Qvarth | 407/46 |

OTHER PUBLICATIONS

Hartog, J.P. Den, "Disk of Uniform Stress", Chapter II, Sec. 11, pp. 65–69, Advanced Strength of Materials, 1980.

Stodola: "Steam and Gas Turbines vol. 1," 1945, Peter Smith, New York XP002079661, see pp. 372–380; figure 364.

Copy of International Search Report, mailed Oct. 20, 1998, in Application No. PCT/US 98/14942, filed Jul. 20, 1998.

*Primary Examiner*—Andrea L. Pitts
*Assistant Examiner*—Henry W. H. Tsai
*Attorney, Agent, or Firm*—John J. Prizzi

[57] ABSTRACT

A high-speed milling cutter is provided that includes a hub rotatable about an axis, a plurality of radially extending arms, and a plurality of cutting inserts, each of which is connected to a distal portion of one of the arms. The arms are tapered with respect to both the horizontal and vertical planes in such a manner that centrifugally induced tensile stresses are substantially equal at all points between the proximal and distal ends. The cross-sectional area of each arm increases at each point radially inwardly so that the ratio of tensile strength to the amount of centrifugal force generated by the cumulative, peripheral mass of the arm at that point remains substantially constant throughout the length of the arm.

25 Claims, 4 Drawing Sheets

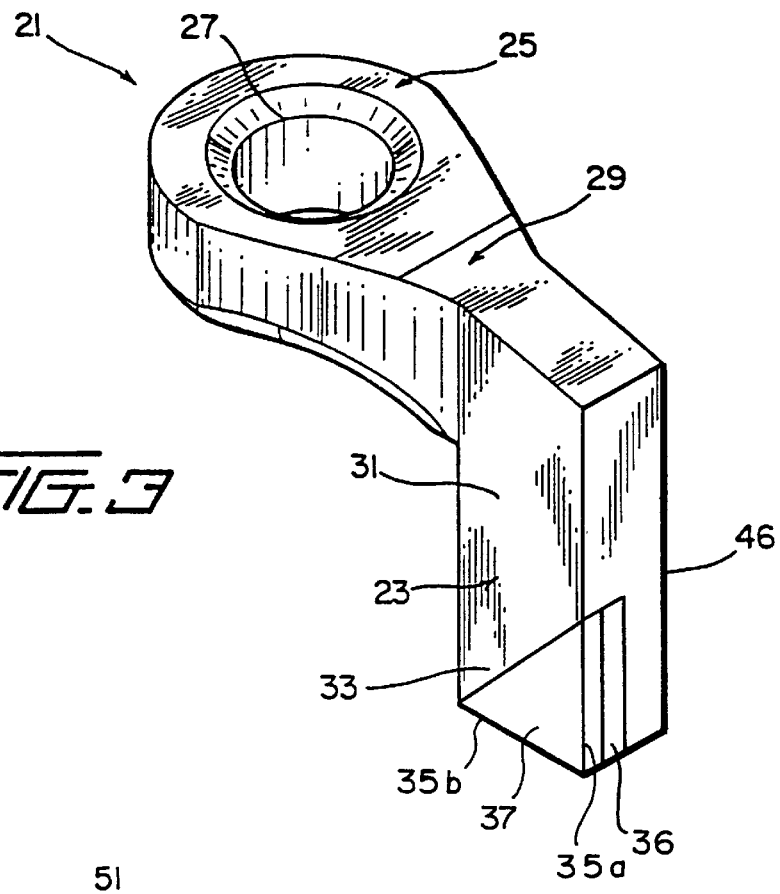
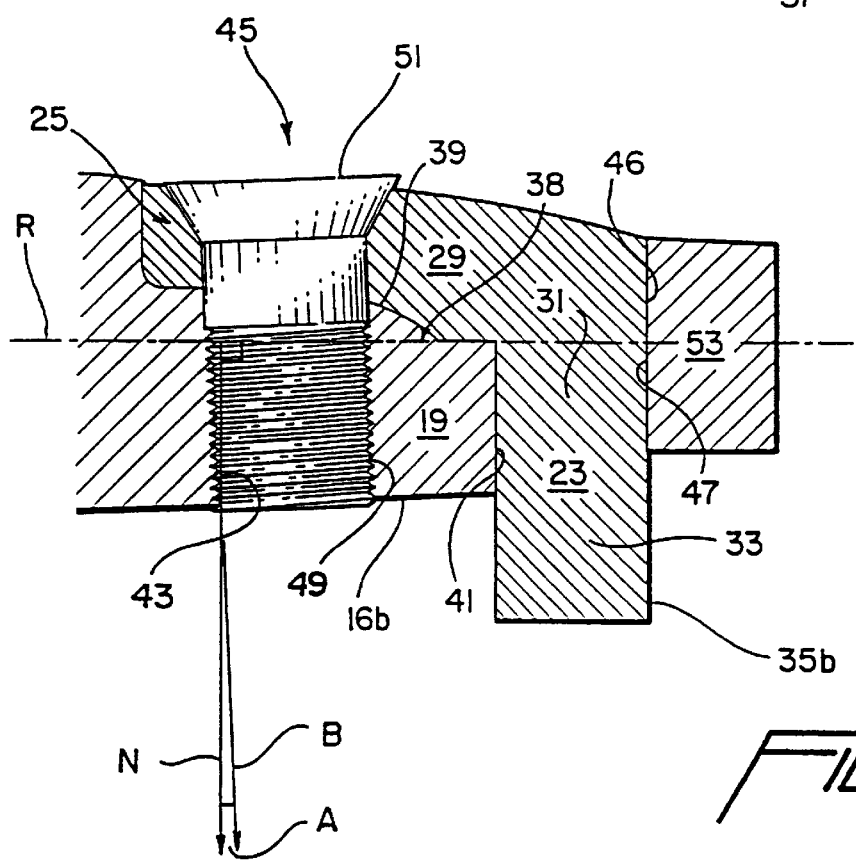

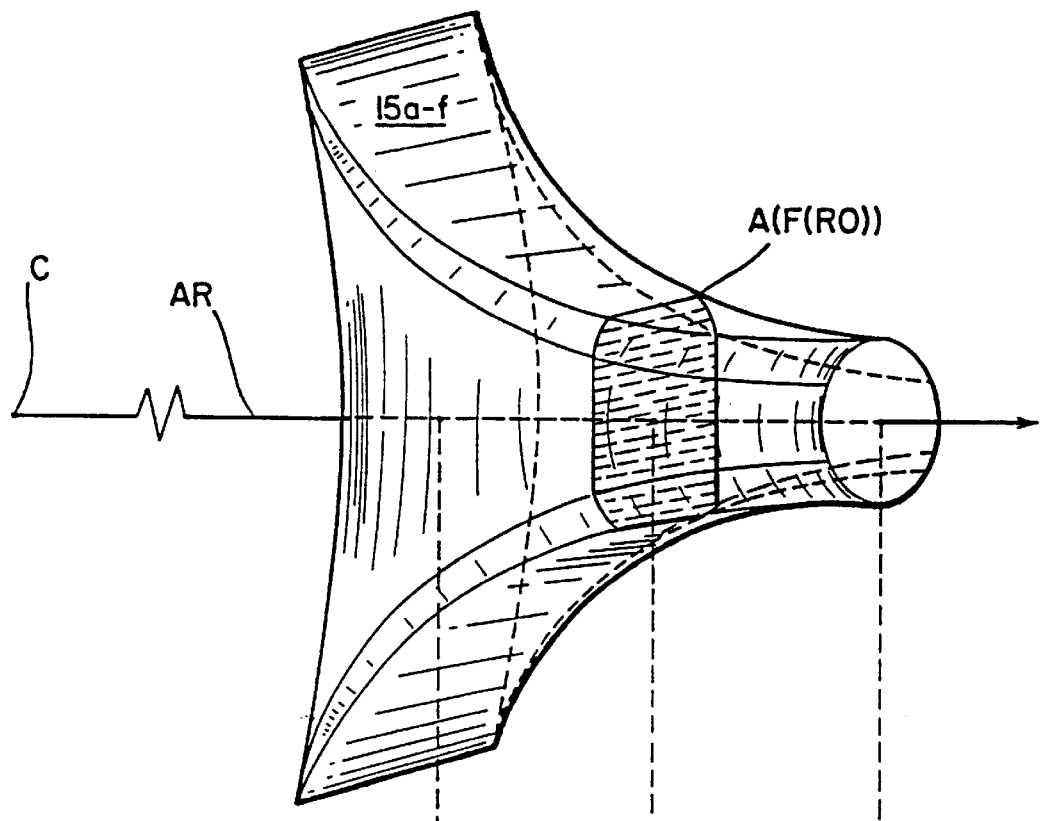
FIG. 5
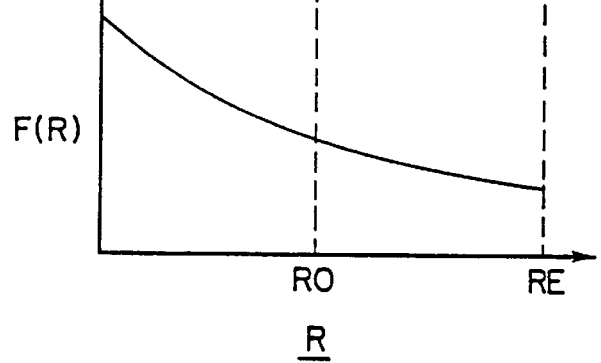

HIGH-SPEED MILLING CUTTER WITH STRESS EQUILIBRATING ARMS

BACKGROUND OF THE INVENTION

This invention generally relates to milling cutters, and is specifically concerned with a high-speed, star-shaped milling cutter having tapered arms that equilibrate centrifugally induced stresses throughout their lengths.

Milling cutters for performing machining operations on metallic workpieces are well known in the prior art. Such cutters typically comprise a cylindrical or disc-shaped body which is detachably connectable to a rotating drive shaft. A plurality of cutting inserts are mounted around the outer periphery of the cutter body for producing a series of metal-shaving cuts on a workpiece. In operation, such milling cutters are typically rotated at speeds of approximately 1,000 to 2,000 rpm while a metal workpiece is engaged against the periphery of the cutter body.

Recently, there has been an increased demand for milling cutters capable of operating at rotational speeds far in excess of 2,000 rpm. The advantages associated with such high speed milling include a faster cutting action which results in a higher metal removal rate on the workpiece, a reduction in the cutting forces applied to the cutting inserts by the workpiece, and a smoother final cut. Such reduced cutting forces smoother final cut. Such reduced cutting forces protract the operating life of the inserts, not only reducing the costs associated with insert replacement, but also the amount of downtime necessary to reorient the cutting edges of indexable inserts. The cost and time of fixturing is also reduced because higher cutting forces require more elaborate and more rigid fixturing to achieve desired accuracy.

As a result of these advantages, a high-speed milling cutter would be capable of not only lowering costs while increasing productivity, but also enhancing the quality of the final machined workpiece since the cutting action is smoother, and leaves a better finish. However, the substantial increase in rotational speed necessary to obtain all the aforementioned advantages also results in a substantial increase in the centrifugal forces generated in the body of the cutter. Generally speaking, the centrifugal force $F_c$ is dependent upon the mass (m) of the cutter body supporting the cutting insert, the length of the radius (r) of the cutter body, and the square of the angular velocity ($\omega$) of the body. The relationship between these parameters may be expressed in the equation $Fc=m\omega^2 xr$. The fact that the centrifugal force (and hence tensile stress) of the cutter body increases with the square of the angular velocity has, up to now, posed a substantial obstacle in the development of a milling cutter capable of operating at speeds higher than 2,000 rpm. A milling cutter rotating at 10,000 rpm would have 25 times more centrifugally induced tensile stress along its periphery than when it was operated at 2,000 rpm. If the same cutter is spun at 50,000 rpm it would have over 600 times more centrifugally induced tensile stress. To reduce the magnitude of these stresses, the few available milling cutters that operate at such high speeds have a diameter of about only two inches.

While the small diameter of such prior art cutters substantially lowers centrifugally-induced tensile stress in the cutter body, it also counteracts some of the advantages of high-speed milling since it results in a lower peripheral speed of the cutter body. For example, in the case of a two inch diameter cutter rotating at 50,000 rpm, the peripheral speed (and hence the speed at which the cutting edges strike the workpiece) is about 300 mph. However, if the diameter of the cutter could be increased to six inches, the peripheral speed would increase to 900 mph.

Presently, two inch diameter cutter running at 50,000 rpm have brazed cutting edges to eliminate stresses induced due to centrifugal forces of the insert. Unfortunately, the small diameter associated with prior art high-speed milling cutters limits the number of cutting edges that can be brazed around the periphery of the cutter body. This is a significant disadvantage since the use of fewer cutting edges necessitates a higher frequency of cutter replacement which is very expensive and time consuming. Finally, the relatively small cutting arc that is necessarily generated by such a small-diametered cutter renders it unsuitable for certain machining operations. For example, in a face milling operation of a large surface, a two inch cutter might require three passes to cover the area, whereas a six inch cutter would only require one pass to machine the same area, reducing machining time to one third. The higher peripheral velocity of the larger cutter also gives a better surface finish.

Clearly, there is a need for a high-speed milling cutter capable of operating at 50,000 rpm that has a substantially larger diameter than two inches so as to increase both the peripheral speed of the cutter, as well as the number of cutting edges that could be mounted around the periphery. Ideally, such a cutter should be relatively inexpensive to manufacture, and should utilize inexpensive, readily replaceable cutting inserts so as to minimize both the cost of fabrication and operation of the device.

SUMMARY OF THE INVENTION

Generally speaking, the invention is a high-speed milling cutter that comprises a hub that rotates about an axis, a plurality of radially-oriented arms, each of which includes a proximal portion connected to the hub periphery and a free distal portion, and a plurality of cutting inserts having cutting portions detachably connected to the distal portions of the arms, wherein the arms are proportioned such that centrifugally induced tensile stresses at all points between the distal and proximal ends thereof are substantially equal.

The use of such an arm structure in contrast to prior art disc or cylindrical structures minimizes the amount of centrifugally induced tensile stress generated by the peripheral mass of the cutter body, as it eliminates all of the material except that which is used to directly support the cutting inserts. Additionally, each of the insert-supporting arms is tapered both in the horizontal and vertical planes from its distal to its proximal end in such a manner that the amount of centrifugally induced tensile stress at any point along the radial length of the arm is substantially the same. This advantageous result is realized by proportioning each arm so that its cross-sectional area increases at every point along its radial length in proportion to the amount of centrifugal force generated by the peripheral mass of the arm in front of the cross-sectional area.

Preferably, the cross-sectional shape of at least the distal end of the arms is curved to avoid localized areas of stress associated with corners. Additionally, the arms and hub are integrally connected to one another in order to avoid joints which could weaken the cutter body in the radial direction. While the integral hub and arms may be formed from high-tensile strength materials such as titanium, beryllium, and certain high-strength polymers, the preferred material is a high-tensile strength steel, such as 4340 steel. Such a material is inexpensive, easily fabricated, and accurately machinable to create insert-receiving recesses in the arms capable of securely holding the inserts used in the cutter during a cutting operation. Moreover, 4340 steel would provide the required rigidity for the HSK (hollow shank taper) type coupling that is preferred in high-speed milling for connecting the cutter to a spindle.

Diamond-layered titanium cutting inserts are preferred, as such inserts minimize the weight of material being supported on the distal portions of the cutter arms while maximizing the life of the cutting edges. However, due to expense, a steel insert can also be used which would have a brazed layer of carbide and a diamond layer bonded onto the carbide layer. Unlike the insert mounting used in conventional cutters, the inserts used in the invention are essentially L-shaped, with the largest part of their bodies completely surrounded by the distal portion of its respective cutter arm. Such an insert mounting insures that the inserts will not detach from the arms during the high-speed milling operation (which could be potentially dangerous to the surrounding personnel), and further minimizes the amount of spurious insert movement during cutting, which in turn results in a smoother and more accurate cutting action.

The high-speed milling cutter of the invention overcomes the aforementioned disadvantages associated with the prior art by providing a cutter having a diameter of six inches or more that can be operated at 50,000 rpm. Moreover, the larger diameter allows more cutting inserts to be mounted around the periphery, and because these inserts move at a higher peripheral speed, both the rate of metal removal and the smoothness of the resulting cut are substantially improved. The ability of the cutter body to support more inserts around its outer periphery minimizes the amount of downtime needed to replace or to reorient inserts having dulled cutting edges. Finally, because the cutter of the invention has only about one-third of the peripheral mass of a prior art disc or cylindrical cutter of the same diameter, the amount of time necessary to accelerate it from a stationary position to operational speed and decelerate to a stationary position from operational speed is substantially reduced, thereby reducing tool change time and further increasing productivity.

BRIEF DESCRIPTION OF THE SEVERAL FIGURES

FIG. 3 is an enlarged perspective view of the cutting insert illustrated in FIG. 1;

Figure 2:
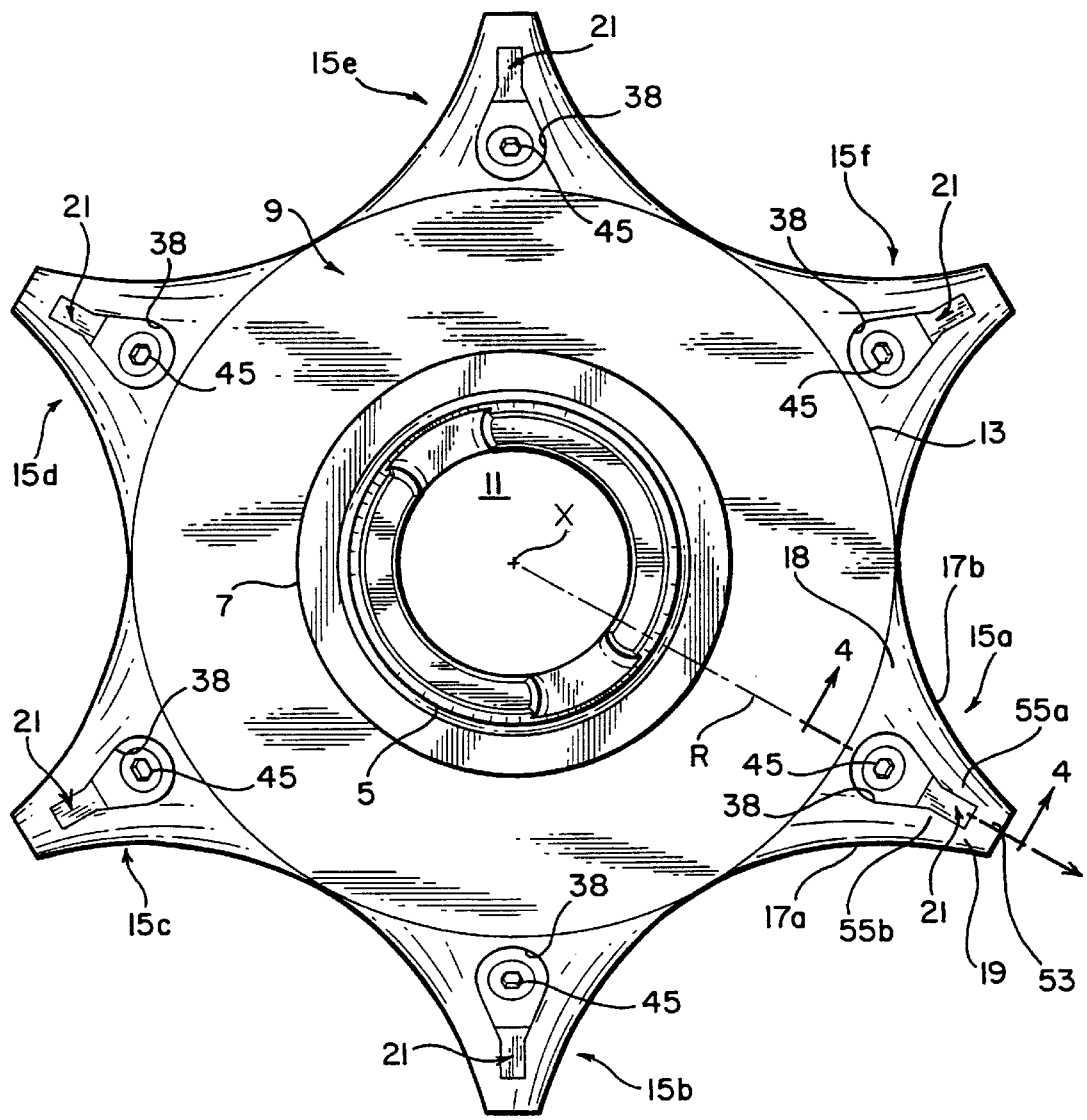
FIG. 2 is a top plan view of the milling cutter illustrated in FIG. 1.

FIG. 4 is an enlarged cross-section side view of one of the cutter arms illustrated in FIG. 2 along the line 4—4, and FIG. 5 is a graph illustrating how the mass of the cutter arms increases radially from their distal to their proximal ends, and hence how the cross-sectional area of the arms increases radially inwardly as the cumulative mass of the arms increases so that the ratio of tensile strength to centrifugally generated force remains a constant at all points in the arms.

DETAILED DESCRIPTION OF THE PREFERRED EMBODIMENT

Figure 1:
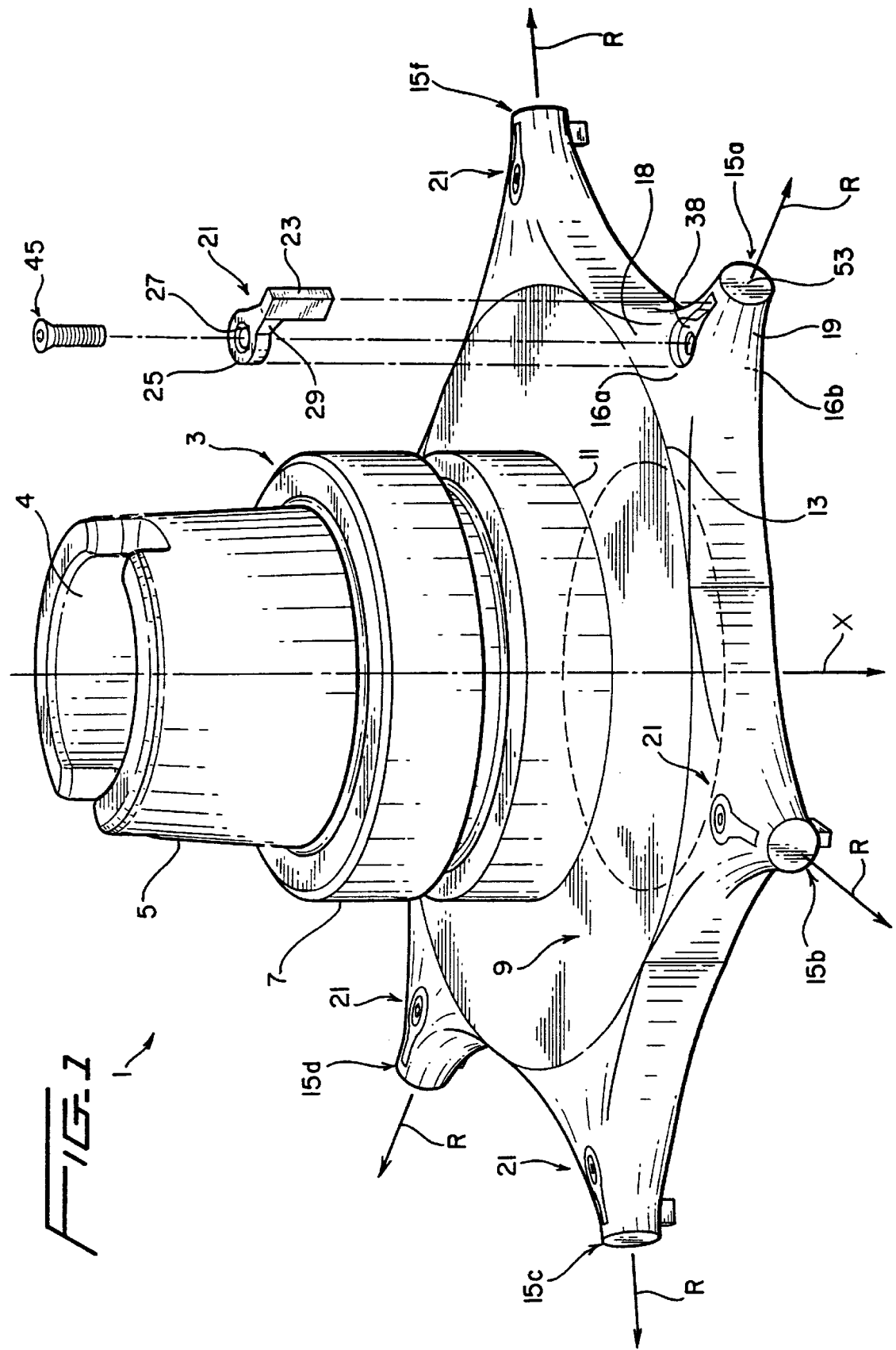
FIG. 1 is a perspective view of the high-speed milling cutter of the invention, illustrating in exploded form the assembly of the cutting inserts on the cutter arms.

With reference now to FIGS. 1 and 2, wherein like components are designated with like numerals throughout all the several figures, the milling cutter 1 of the invention generally comprises a shank 3 connected to a disc-shaped hub 9 having a plurality of radially oriented, insert-supporting arms 15a–f disposed around its periphery. Each of the arms 15a–f supports a single cutting insert 21 whose edges may be used to cut a metal or non-metal workpiece. The shank 3 has a hollow interior 4, a frustro-conical upper end 5, and a cylindrical lower portion 7. The upper end 5 is receivable within a complementarily shaped recess of a high-speed drive shaft (not shown). The cylindrical lower portion 7 is integrally connected in concentric relationship with a central portion 11 of the disc-shaped hub 9. The hub 9 has a circular perimeter onto which the insert-supporting arms 15a–f are integrally mounted.

The center of mass of each of the arms 15a–f is aligned with a line R that is radially disposed with respect to the axis X of rotation of the cutter, as is shown in FIG. 1. Each of the arms 15a–f includes top and bottom walls 16a,b (best seen in FIG. 1), and opposing sidewalls 17a,b (best seen in FIG. 2). Additionally, each of the arms has a proximal portion 18 which is integrally connected to the circular perimeter 13 of the disc-shaped hub 9, and a distal portion 19 that extends beyond its cutting insert 21. Each of the arms 15a–f is tapered from its proximal portion 18 to its distal portion 19 both between its top and bottom walls 16a,b, and its sidewalls 17a,b. As will be discussed in more detail hereinafter, the three dimensional tapering of each of the arms 15a–f is proportioned in such a manner to allow the invention to achieve its primary objective of equilibrating the centrifugally-induced stresses in the arms 15a–f from their distal to their proximal ends.

FIG. 3 illustrates the cutting insert 21 that is mounted onto the ends of each of the arms 15a–f. Each of these inserts 21 is roughly L shaped, including a rectangular cutting portion 23, and an annular mounting portion 25 having a circular opening 27 for receiving a mounting screw. A tapered, bridging portion 29 integrally interconnects the rectangular cutting portion 23 with the annular mounting portion 25. The rectangular cutting portion 23 has a proximal end 31, and a distal end 33. With reference now to FIG. 4, the proximal end 31 of rectangular portion 23 is captured within the cutting arm when the insert 21 is mounted therein, while the distal end 33 projects out the bottom wall 16b of the arm. The outer face of the rectangular cutting portion 23 includes a pair of cutting edges 35a,b. While the inserts 21 may be made from any suitable material, a titanium insert with a brazed carbide layer 36 bonded to an outer polycrystalline diamond (PCD) layer 37 is preferred since the use of such material minimizes the weight of the insert 21, while the hardness (and hence the life) of the cutting edges 35a,b is maximized. Alternatively, because of manufacturing costs a steel or aluminum insert with a brazed carbide layer bonded to an outer PCD layer can also be used. It is preferable to include the backing layer 36 between the PCD 37 and the substrate to provide sufficient support for the brittle PCD. It is also possible to secure the PCD 37 directly to the insert, however, under such conditions the PCD 37 would not be easily replaced. Finally, it is possible to use another material instead of PCD 37 such as for example, a carbide or coated carbide.

With reference again to FIG. 4, the distal portion 19 of each of the arms 15a–f includes an insert-receiving opening 38. Each opening 38 has a complementary recess 39 for receiving the annular mounting portion 25 of the insert 21, and a rectangular through-hole 41 for receiving the rectangular cutting portion 23. A threaded bore 43 extends downwardly from the complementary recess 39 of the insert-receiving opening 38 in alignment with the circular opening 27 of an insert 21 mounted therein. It should be noted that the bore 43 is not collinear with a line N orthogonal to radial line R, but is instead aligned with line B which is canted at an angle A of approximately 3° with respect to orthogonal line N. The canted bore 43 and a mounting screw 45 cooperate to bias the distal most wall 46 of the insert 21 against a pilot wall 47 of the insert-receiving opening 38. Screw 45 includes a threaded end 49 that is engageable with the bore 43, and a tapered head 51 that cooperates with a bevel circumscribing the circular opening 27 to securely clamp the annular mounting portion 25 of the insert 21 into complementary recess 39, while the aforementioned angling of the bore 43 causes the screw 45 to simultaneously snug the distal most wall 46 of the insert 21 against pilot wall 47 of the opening 38. The provision of a pilot wall 47 in the insert-receiving opening 38 of each of the arms 15a–f which is precisely the same radial distance from the axis of rotation A of the cutter, in combination with the aforementioned mounting screw 45, insures that the cutting edges 35a,b of each of the inserts 21 extends the same radial distance from the center of rotation A which insures uniform loading on the inserts 21 resulting in a smooth and accurate cutting action.

Each of the insert-supporting arms 15a–f includes a distal end 53 that terminates in a circular face to avoid the stresses that would otherwise be caused by the presence of angular corners at this location. Distal end 53 on the arms 15a–f extends beyond the distal most wall 46 of its respective insert 21 to an extent sufficient to insure an adequate rigidity of the pilot wall 47. In the preferred embodiment, the thickness of the distal end 53 along radial line R is nearly the thickness of the rectangular cutting portion 23 of the insert 21. The distance between the sidewalls 17a,b of each of the arms 15a–f should be sufficient to insure a similar rigidity for the inner sidewalls of the insert-receiving opening 38. The materials that most cutting inserts are formed from (such as tungsten carbide) is high on compressive strength, but low on shear strength. Accordingly, to avoid insert failure in the form of cracking or chipping, it is essential that the insert 21 be rigidly and securely supported on as many surfaces as possible at the elevated speeds of operation so that the insert 21 experiences predominantly compressive loads, with a minimum of tensile or shear loads. The insert 21 previously described, and the manner in which it is clamped within the complementarily-shaped opening 38 via mounting screw 45, provides the necessary rigid support needed for high-speed operation. It also provides an extremely secure mounting along the radial line R, thereby preventing the entire insert 21 from flying out of its respective arm 15a–f in the case of an insert failure. Even if the distal end 33 of the rectangular cutting portion 23 breaks off during a cutting operation, the main body of the insert 21 will remain secure within its respective arm.

The shape of the insert 21 used in the invention minimizes the amount of insert mass near the distal end 53 of the arm, thereby minimizing the amount of centrifugally-induced stress generated by the weight of insert 21. Both the upper and lower portions of each of the inserts 21 and the depth of the insert receiving opening 38 are proportioned so that the center of mass of each insert 21 is aligned with the radial line R of its respective arm 15a–f. Such an alignment advantageously prevents the inserts 21 from generating a bending moment on its respective arm 15a–f along the axis of rotation A when the milling cutter 1 is rotated at high speeds.

FIG. 5 illustrates some of the mathematical relationships between the cumulative mass of the cutter arms 15a–f, and how the cross-sectional area of the arms increases in a radial direction from the distal to the proximal ends of the arms to equilibrate the centrifugally-induced tensile stresses generated by the mass of the arm. In FIG. 5, the line AR is radially oriented with respect to the center C of the disc-shape hub 9 of the cutter 1. The axis of rotation A of the cutter 1 passes through the center point C at right angles. The axis of rotation AR of the arms 15a–f is not only radially disposed, but also passes through the center of gravity of each of the arms 15a–f.

The force centrifugal $F_c$ that a radial portion of one of the arms 15a–f applies to the body of the cutter 1 is $m\omega^2 r$ where $\omega$ is the angular velocity and r is the distance between the axis of rotation A of the cutter 1 and center of gravity of the radial arm portion. Let us take, for example, the mass of that portion of the arm 15a–f between RO and RE. The center of gravity of the mass of the portion RO, RE is indicated as CG in the drawing above the graph. As is further indicated in FIG. 5, the radial distance between the axis of rotation A of the milling cutter 1 and the center of gravity CG of the portion RO,RE of the arm 15a–f is indicated as "r". The centrifugal force $F_c$ that the portion RO,RE of the arm 15a–f applies to the milling cutter 1 is the mass of this portion of the arm at point $CG \times r \times \omega^2$. This force $F_c$ is counteracted by the tensile strength of the arm 15a–f at point RO, which is in turn is dependent upon the area A of the arm at RO. Generally speaking, we want the ratio of $F_c$/Tensile Strength $\approx F_c/A$ to be as constant as possible from the distal to the proximal ends of the arms 15a–f. The attainment of such a relationship between centrifugally induced forces and the tensile strength of the arms would advantageously result in constantly maintained centrifugally-induced stresses throughout the entire radial length of each of the arms 15a–f.

In order to compute the mass of a particular portion RO,RE of an arm 15a–f along its radius, we must multiply its volume times its density $\rho$. The volume of an arm 15a–f may be computed by integration by the formula $$\int_{RO}^{RE} V(F(R), R) dR$$

where R is the length of an arm 15a–f from the area of cross-section RO, to the end RE, the function V being dependent upon R and the function F(R). The mass of an arm 15a–f would be $$\rho \int_{RO}^{RE} V(F(R), R) dR$$

where $\rho$ is the density of the material. The area of cross-section of an arm at RO can be represented by the function A(F(RO), and the distance r between the cutter axis of rotation A and the center of gravity CE can be represented by r(F(R),R,RO,RE), because r is dependent on the function F(R), the length of arm portion R, RO and RE. The stress $F_c/A$ at any cross-section RO can be represented as follows:

$$Stress_{RO} = \frac{\omega^2 r(F(R), R, RO, RE)\rho \int_{RO}^{RE} V(F(R), R) dr}{A_O(F(R), RO)}$$

Advantageously, stress should remain constant all throughout the radial length of the arm. Any high stress point in an arm would become the weakest point and the one most likely to fail. The analogy is similar to the strength of a chain being no stronger than its weakest link. So the invention seeks to make all the "links" along AR of the same strength. From the above stress equation it can be seen that the stress value at any cross-section of an arm 15a–f is dependent on the function F(R) and R. Therefore the key is to define the function F(R) with respect to R. Such a function F(R) may not be strictly applicable in reality because of previously discussed constraints with respect to the thickness of distal end 53 and sidewalls 17a,b necessary for the arm to rigidly support its respective insert 21. However, a function as close as possible should be chosen which would minimize the variation of stresses along the arms 15a–f and also satisfy realistic constraints. Such proportioning allows the cutter body to be spun at a higher speed.

The milling cutter is intended to operate at high speeds which implies that balancing becomes very important. Imbalance may occur because of non homogeneous material, minute material defects, machining inaccuracy etc. Therefore, the milling cutter may require supplemental balancing which may be accomplished through the introduction of any one of a number of commercial balancing techniques available. This could include the use of balancing rings described in U.S. Pat. No. 5,074,723 which is entitled as "Method and Apparatus for Balancing a Rotary Tool Assembly" and assigned to Kennametal Inc. U.S. Pat. No. 5,074,723 is hereby incorporated by reference.

Although this invention has been described with respect to a preferred embodiment, various additions, modifications, and variations will become evident to those of ordinary skill in the art. All such additions, modifications, and variations are intended to fall within the scope of this invention, which is constrained only by the claims appended hereto.

What is claimed is:

1. A high-speed milling cutter, comprising:
   a hub rotatable about an axis and having a periphery;
   a plurality of arms, each of which includes a proximal portion connected to said hub periphery and a free distal portion, each of which is radially oriented with respect to said axis of rotation;
   a plurality of cutting inserts connected to the distal portions of said arms,
   wherein said arms are tapered with respect to two orthogonally oriented planes that intersect along a radially oriented, center line in each arm and a cross-sectional area of each of said arms increases from said distal to said proximal portions such that centrifugally induced tensile stresses at all points between said distal and proximal portions are about equal.

2. The high-speed milling cutter defined in claim 1, wherein the cross-sectional shape of an outer surface of said distal portion of said arms is curved to avoid localized areas of stress.

3. The high-speed milling cutter defined in claim 1, wherein said arms are integrally connected to said hub.

4. The high-speed milling cutter defined in claim 3, wherein said arms and said hub are formed from the same material.

5. The high-speed milling cutter defined in claim 4, wherein said material is a high tensile strength steel.

6. The high-speed milling cutter defined in claim 1, wherein said inserts are predominantly formed from titanium having a diamond layer.

7. The high-speed milling cutter defined in claim 1, wherein each arm has a cutting insert, an opening for receiving an insert, and a screw means for fastening the insert into said opening.

8. The high-speed milling cutter defined in claim 1, wherein each of said inserts has a center of mass that is aligned with said center line of the arm it is connected to.

9. The high-speed milling cutter defined in claim 1, wherein said cutter includes at least three arms.

10. A high speed milling cutter, comprising:
    a hub rotatable about an axis and having an outer periphery that is concentrically disposed around said axis;
    a plurality of arms, each of which includes a proximal portion connected to said hub periphery and a free distal portion, each of which is radially oriented with respect to said axis of rotation and continuously tapered from said proximal to said distal portion with respect to both a radially oriented plane that is parallel to and which intersects said axis of rotation and a plane that is orthogonal to such axis of rotation;
    a plurality of cutting inserts, each of which is connected to one of said plurality of arms,
    wherein the cross-sectional area of each of said arms across said radial orientation increases from said distal to said proximal portion such that centrifugally induced tensile stresses in said arms are about equal at all points between said distal to said proximal portions.

11. The high-speed milling cutter defined in claim 10, wherein the cross-sectional shape of an outer surface of said distal portion of said arms is curved to avoid localized areas of stress and wherein said arms are integrally connected to said hub.

12. The high-speed milling cutter defined in claim 10, wherein both said arms and said hub are formed from one of the group consisting of titanium, beryllium, steel and high tensile strength polymers.

13. The high-speed milling cutter defined in claim 10, wherein said inserts are formed substantially from steel or aluminum brazed with carbide layer bonded to a diamond layer.

14. The high-speed milling cutter defined in claim 10, wherein each of said arms has a recess for receiving a mounting portion of said insert, a through hole for receiving a cutting portion of said insert, and a screw means for fastening said insert onto said arm, and wherein the cutting portion of each of said inserts includes at least two indexable cutting edges.

15. The high-speed milling cutter defined in claim 10, wherein said cutter includes between three or more arms.

16. The high-speed milling cutter defined in claim 10, wherein each of said cutting inserts includes a cutting portion that laterally projects from a side of the arm to which it is connected, and wherein each of said arms includes a distal end that radially extends beyond its respective cutting insert to define a rigid pilot wall.

17. A high-speed milling cutter comprising:
    a plurality of tapered arms connected to a rotatable hub, each of which terminates in a distal portion that includes a cutting insert,
    wherein each of said inserts includes a connecting portion for mounting said insert onto said distal portion of said tapered arms, and a cutting portion having a proximal end connected to and extending substantially orthogonally from said connecting portion and a distal end for cutting a workpiece, wherein the distal portion of each of said arms includes an opening for receiving and supporting the proximal end of the cutting portion of one of said inserts, and said opening extends completely through said arm, is complementary in shape to said proximal end of the cutting portion of said inserts, and is parallel to an axis of rotation of said hub.

18. The high-speed milling cutter defined in claim 11, wherein said opening includes a pilot wall, and further comprising a fastener for securing said connecting portion of each of the inserts onto said distal portion of said arm so as to bias said proximal end of the cutting portion of one of said inserts against said pilot wall.

19. The high-speed milling cutter defined in claim 18, wherein said fastener is a screw, and wherein said connecting portion of said insert includes an opening for receiving said screw, and said distal arm portion includes a threaded bore for engaging a threaded end of said screw, said bore being canted such that said screw applies a biasing force to said proximal end of the cutting portion of said inserts.

20. The high-speed milling cutter defined in claim 17, wherein said distal end of the cutting portion of said insert includes a layer of carbide for forming said cutting edge.

21. The high-speed milling cutter defined in claim 17, wherein each of said distal portions of said arms includes a recess for receiving the connecting portion of said inserts.

22. The high-speed milling cutter defined in claim 21, wherein said recess is complementary in shape to said connecting portion of said insert.

23. A high-speed milling cutter comprising:

a plurality of tapered arms connected to a rotatable hub, each of which terminates in a distal portion that includes a cutting insert, wherein each of said inserts includes the connecting portion for mounting said insert onto said distal portion of said tapered arms, and a cutting portion having a proximal end connected to and extending substantially orthogonally from said connecting portion and a distal end for cutting a workpiece, wherein said distal portion of said tapered arms includes a recess and an opening for receiving the connecting and cutting portions of said inserts, respectively, and for aligning a center of mass of said insert with a center radial line of said arm to avoid the generation of a bending moment in said arm when said milling cutter is rotated.

24. A high-speed milling cutter, comprising:

a hub rotatable about an axis and having a periphery;

a plurality of arms, each of which includes a proximal portion connected to said hub periphery and a free distal portion, each of which is radially oriented with respect to said axis of rotation, each of said arms being tapered from said proximal to said distal portion such that centrifugally induced tensile stresses at all points between said distal and proximal portions are about equal, and a plurality of cutting inserts connected to the distal portions of said arms, each of said inserts having a center of mass aligned with a center line of its respective arm to prevent the mass of the insert from generating a centrifugally induced bending moment on its respective arm when said cutter rotates.

25. A high-speed milling cutter comprising:

a plurality of tapered arms connected to a rotatable hub, each of which terminates in a distal portion that includes a cutting insert;

wherein each of said inserts includes a connecting portion for mounting said insert onto said distal portion of said tapered arms, and a cutting portion extending substantially orthogonally from said connecting portion for cutting a workpiece, and wherein said distal portion of said tapered arms includes a recess and an opening for receiving the connecting and cutting portions of said inserts, respectively, and for aligning a center of mass of said insert with a center radial line of said arm to avoid the generation of a bending moment in said arm when said milling cutter is rotated.

* * * * *